United States Patent [19]

Shiba et al.

[11] Patent Number: 5,301,181
[45] Date of Patent: Apr. 5, 1994

[54] INFORMATION DUBBING APPARATUS WITH AUTOMATIC EJECTING OF REPRODUCED MEDIUM AND RESTART OF RECORDING

[75] Inventors: Takahumi Shiba; Hiroyasu Eguchi, both of Tokorozawa, Japan

[73] Assignee: Pioneer Electronic Corporation, Tokyo, Japan

[21] Appl. No.: 823,611

[22] Filed: Jan. 17, 1992

Related U.S. Application Data

[63] Continuation of Ser. No. 556,507, Feb. 24, 1990, abandoned.

[30] Foreign Application Priority Data

Sep. 22, 1989 [JP] Japan ............................ 1-246744

[51] Int. Cl.$^5$ .............................................. G11B 7/28
[52] U.S. Cl. .......................................... 369/84; 360/15
[58] Field of Search ............... 369/84, 85, 14, 32–34, 369/36; 360/92, 15

[56] References Cited

U.S. PATENT DOCUMENTS

| | | | |
|---|---|---|---|
| 4,167,026 | 9/1979 | Sambe et al. | 369/85 X |
| 4,622,610 | 11/1986 | Makigawa | 360/92 |
| 4,841,503 | 6/1989 | Yamada et al. | 369/85 X |
| 4,916,681 | 4/1990 | Takamatsu | 369/85 X |
| 4,916,682 | 4/1990 | Tomoda et al. | 369/84 X |

FOREIGN PATENT DOCUMENTS

| | | | |
|---|---|---|---|
| 0041504 | 4/1981 | Japan | 369/85 |
| 0129902 | 7/1985 | Japan | 369/84 |

*Primary Examiner*—W. R. Young
*Attorney, Agent, or Firm*—Sughrue, Mion, Zinn, Macpeak & Seas

[57] ABSTRACT

Information reproduced and output from an information reproduction device such as a CD player is recorded and thereby copied by an information recording device such as a cassette deck. Once a desired dubbing has been completed, the recording medium such as a CD accommodated in the information reproducing device is automatically discharged.

10 Claims, 5 Drawing Sheets

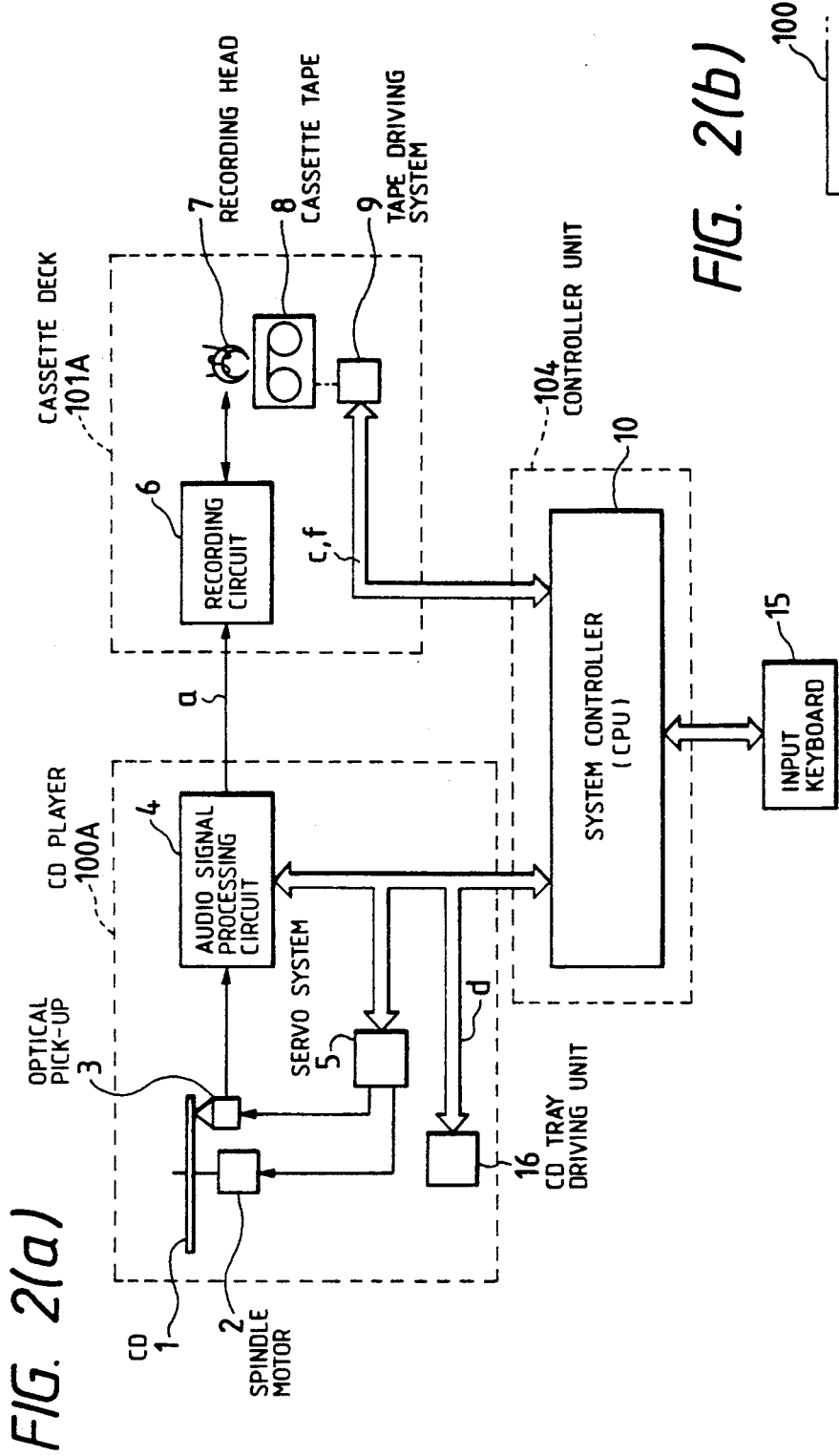
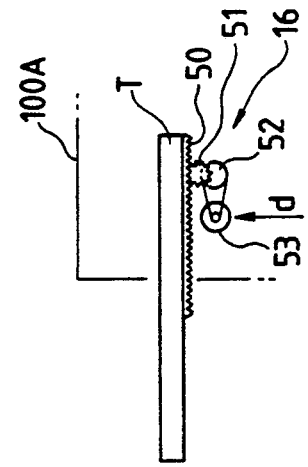
FIG. 2(a)
FIG. 2(b)

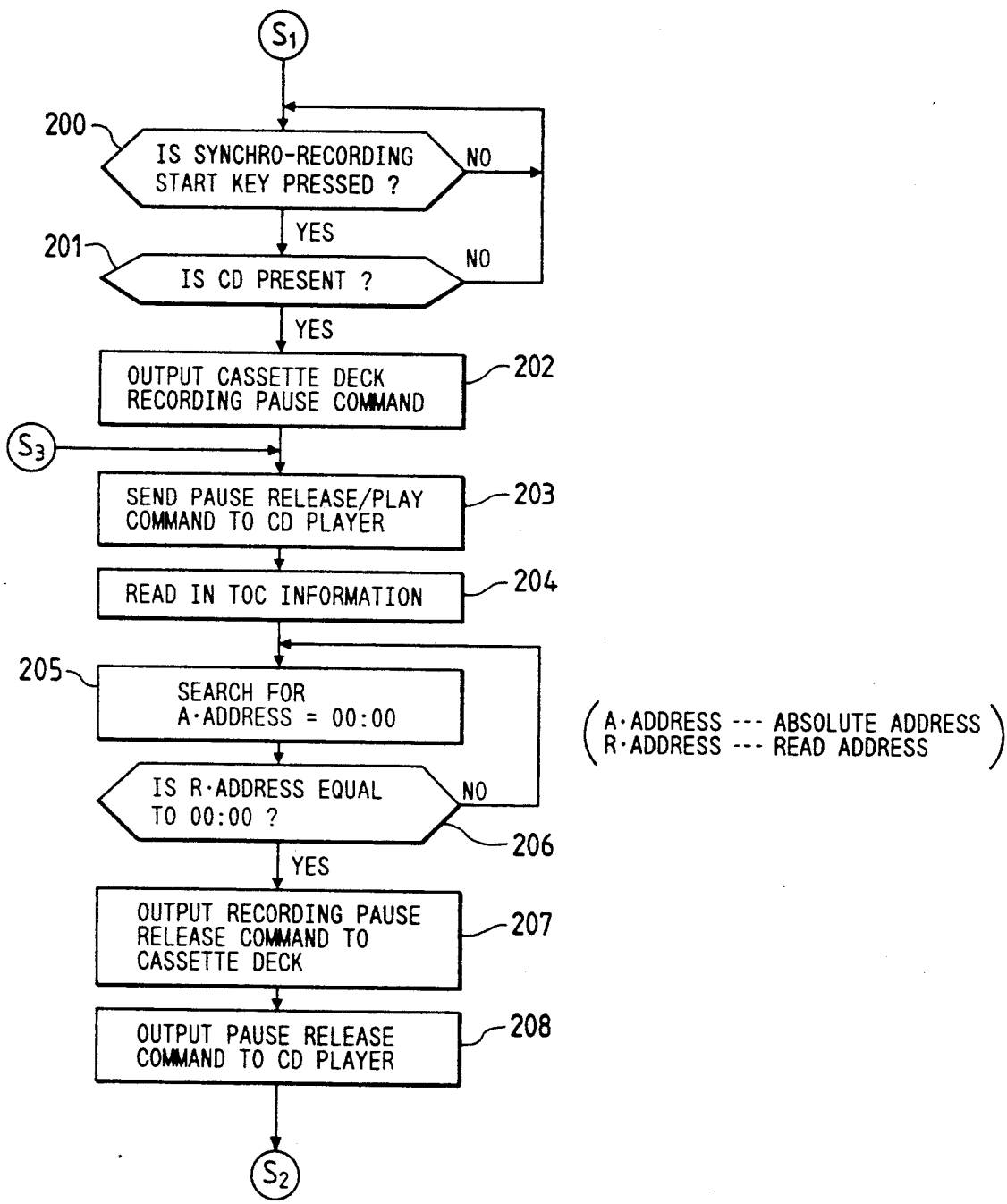

INFORMATION DUBBING APPARATUS WITH AUTOMATIC EJECTING OF REPRODUCED MEDIUM AND RESTART OF RECORDING

This is a continuation of application Ser. No. 07/556,507 filed Jul. 24, 1990, now abandoned.

BACKGROUND OF THE INVENTION

1. Field of the Invention

The present invention relates to an information recording/reproducing apparatus, and more particularly, to a dubbing apparatus for synchro-recording the information which is being reproduced with an information reproducing device such as a CD player, to make a copy of the information with an information recording device such as a cassette tape deck.

2. Description of the Prior Art:

It is a common practice to transfer the information recorded on a first recording medium onto a second recording medium. This is generally called a dubbing. Dubbing may be conducted by reproducing the music information recorded on the first recording medium, which may be a CD, with a CD player to generate a reproduction signal, and by recording this reproduction signal on the second recording medium, which may be a magnetic tape (hereinafter referred to as a cassette tape), through a tape deck. In that case, a synchro-recording method is adopted in order to synchronize the operation of the CD player, which is the information reproducing device, with that of the tape deck, which is the information recording device.

In conventional synchro-recording, when reproduction of the information on the CD, by means of the CD player, is ended, the operation of the tape deck is automatically suspended or is rendered to a state in which recording is at a pause.

The above described conventional recording method has an advantage in that, since the operation of the CD player, which is the information reproducing device, is synchronized with the operation of the tape deck, which is the information recording device, the information recorded on the CD can be copied without alteration (for example, with the same time intervals between the two music pieces or in the same order in which the music pieces are recorded).

However, in the above dubbing, the recording time of the CD is not always the same as that of the cassette tape: a user may use a cassette tape which has a longer recording time than the CD. In such a dubbing recording, a non-recorded portion of the cassette tape remains, so the information recorded on another CD may be recorded on that non-recorded portion of the cassette tape. At that time, the CD must be replaced with another one by pressing an open key of the CD player thereby causing a CD tray to protrude or open. This operation of opening the CD tray is troublesome and disturbs a series of recording operations.

SUMMARY OF THE INVENTION

An object of the present invention is to provide an information recording/reproducing apparatus which enables a first recording medium, from which information is reproduced, to be automatically removed from a player to assure a smooth dubbing operation.

To this end, the present invention provides an information recording/reproducing apparatus which comprises: an information reproducing device in which a first recording medium is detachably housed, the information reproducing device reproducing an outputting information recorded on the first recording medium; an information recording device for recording the reproduced information on a second recording medium; a reproduction completion detection means for detecting the completion of reproduction of the information recorded on the first recording medium by means of the information reproducing device; a reproduction restart detection means for detecting restart of the reproduction by means of the information reproducing device; and a control means for outputting a stop command to stop a recording operation of the information recording device and a removal command to remove the first recording medium from the information reproducing device when the completion of the reproduction is detected and for outputting a start command to start the recording operation of the information recording device when the restart of the reproduction is detected.

Further objects, features and other aspects of this invention will be understood from the following detailed description of the preferred embodiments of this invention with reference to the drawings.

BRIEF DESCRIPTION OF THE DRAWINGS

FIG. 2a is a block diagram of a first embodiment of the present invention;

FIG. 2b shows the configuration of a CD tray driving unit;

FIG. 3 is a flowchart of the operation of a system controller;

DESCRIPTION OF THE PREFERRED EMBODIMENTS

Figure 1:
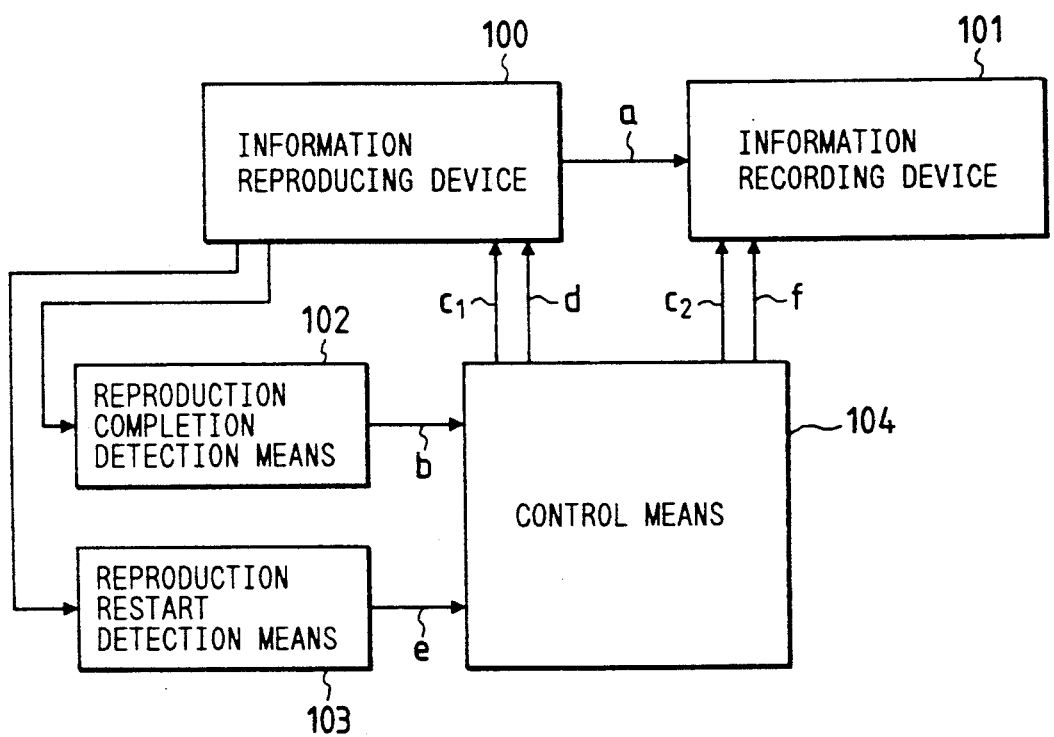
FIG. 1 illustrates the principle of the present invention.

First, the principle of the present invention will be described with reference to FIG. 1.

In the present invention, information (a) reproduced by the information reproducing device 100 in which a first recording medium is accommodated is transmitted to an information recording device 101 and recorded on a second recording medium. At that time, a reproduction completion detection means 102 detects completion of the reproduction of the information on the first recording medium by means of the information reproducing device 100. Once reproduction completion detection means 102 detects the completion of the reproduction, it sends the reproduction completion detection signal (b) to a controller unit 104. Upon receipt of this reproduction completion detection signal (b), the controller unit 104 sends a stop command signal (c1) and a detaching command signal (d) to the information reproducing device 100 to automatically remove the first recording medium from the information reproducing device 100. The controller unit 104 also sends a stop command signal (c2) to the information recording device 101 to stop the recording operation of the information recording device. Hence, the conventionally required operation for removing the first recording medium from the information reproducing device is eliminated, and operability is thus improved. Thereafter, the first recording medium is replaced with another one, and reproduction of the new first recording medium is then started, by means of which recording of the reproduced information on the second recording medium is automatically started.

Next, a first embodiment of the present invention will be described with reference to FIG. 2 to 4.

The first embodiment includes a CD player 100A as the information reproducing device, a cassette deck 101A as the information recording device, and an independent controller unit 104 which includes the reproduction completion detection means, the reproduction restart detection means and the control means.

In the CD player 100A, the information recorded on a CD 1 is optically read by means of an optical pickup 3 to generate a reproduction signal while the CD 1 is being rotated by means of a spindle motor 2. An audio signal processing circuit 4 conducts on the reproduction signal various signal processings including amplification, demodulation and D/A conversion, and outputs a resultant signal as audio reproduction information (a). Tracking servo control and spindle servo control are conducted on the spindle motor 2 by means of a servo system 5 under the control of a system controller 10 in the controller unit 104. Similarly, focussing servo control is conducted on the optical pick up 3 through the servo system 5 by means of the system controller 10. The CD 1 is placed on a tray T, as shown in FIG. 2(b), on the undersurface of which a rack 50 is mounted. The rack is in mesh with a pinion 51, which is connected to a motor 53 through a reduction gear 52. The tray T can be forced in and out from the CD player 100A by means of the rotation of the motor 53. The motor 53 and the rack and pinion mechanism in combination form a CD tray driving unit 16.

In the cassette deck 101A, the reproduction signal (a) sent from the CD player 100A is received by a recording circuit 6. After signal processing required for recording is conducted on the received signal, the signal is recorded on a cassette tape 8 by means of a recording head 7. The cassette tape 8 is rotated by means of a tape driving system 9 under the control of the controller 104.

The controller 104 is constructed by a CPU which executes a plurality of previously set control programs and thereby controls the CD player 100A and the cassette deck 101A. The control programs will be described below in connection with the present invention, description of the portion related to the normal recording and reproduction operations being omitted. A sequence of control operations of the controller 104 are executed in accordance with the operations which are input from an input key board 15.

The synchro-recording operation according to the present invention will be described with reference to FIGS. 3 and 4.

In FIG. 3, it is first determined in step 200 whether or not a synchro-recording start key (not shown) on the input key board 15 is pressed. If the answer is NO, the process returns to a start, and pressing of the synchro-recording start key is awaited. If the synchro-recording start key is pressed, i.e., if the answer is YES, it is determined in step 201 whether or not the CD 1 is present on the CD tray. Presence of the CD 1 on the CD tray may be determined by checking whether the optical pick up 3 can be focussed by means of the servo system 5 in a state where the spindle motor 2 is being rotated or by checking whether an RF signal, which is output from the optical pick up 3, is present. If no CD 1 is present, i.e., if the answer is negative, the process returns to a start. If the CD 1 is present, i.e., if the answer is affirmative, a recording pause command is given to the cassette deck 101A from the system controller 10 in step 202 to render the cassette deck 101A to a recording waiting state. Next, the pause release/play command is sent to the CD player 100A from the system controller 10 in step 203 to render the CD player 100A in a reproduction waiting state in which the CD 1 is rotated and a lead-in portion is read out. Next, TOC (Table Of Content) information in the CD 1 is read in step 204 by the system controller 10, and the absolute address A. Address=00:00 is then searched for in step 205. The absolute address A.Address=00:00 represents the address of the beginning of a music piece which is recorded on any CD 1. Hence, the beginning of the music piece recorded on the CD 1 is searched for in step 205. Next, it is determined in step 206 whether or not the read address R.Address is 00:00. If 00:00 is not yet searched for, i.e., if the answer is NO, search continues. If the read address R.Address is 00:00, if the answer is YES, the pause release command is also output to the cassette deck 101A in step 208. As a result, the information reproduced by the CD player 100A is recorded on the cassette tape 8 in the cassette deck 101A.

Thus, the reproduction information (a) is transferred from the CD player 100A to the cassette deck 101A and is thereby copied on the cassette tape 8.

At that time, the completion of reproduction of the information on CD 1 and presence of the non-recorded area in the cassette tape 8 are checked so that the system controller 10 can control the CD player 100A and the cassette deck 101A accordingly. FIG. 4 is a flowchart of that operation.

Figure 4:
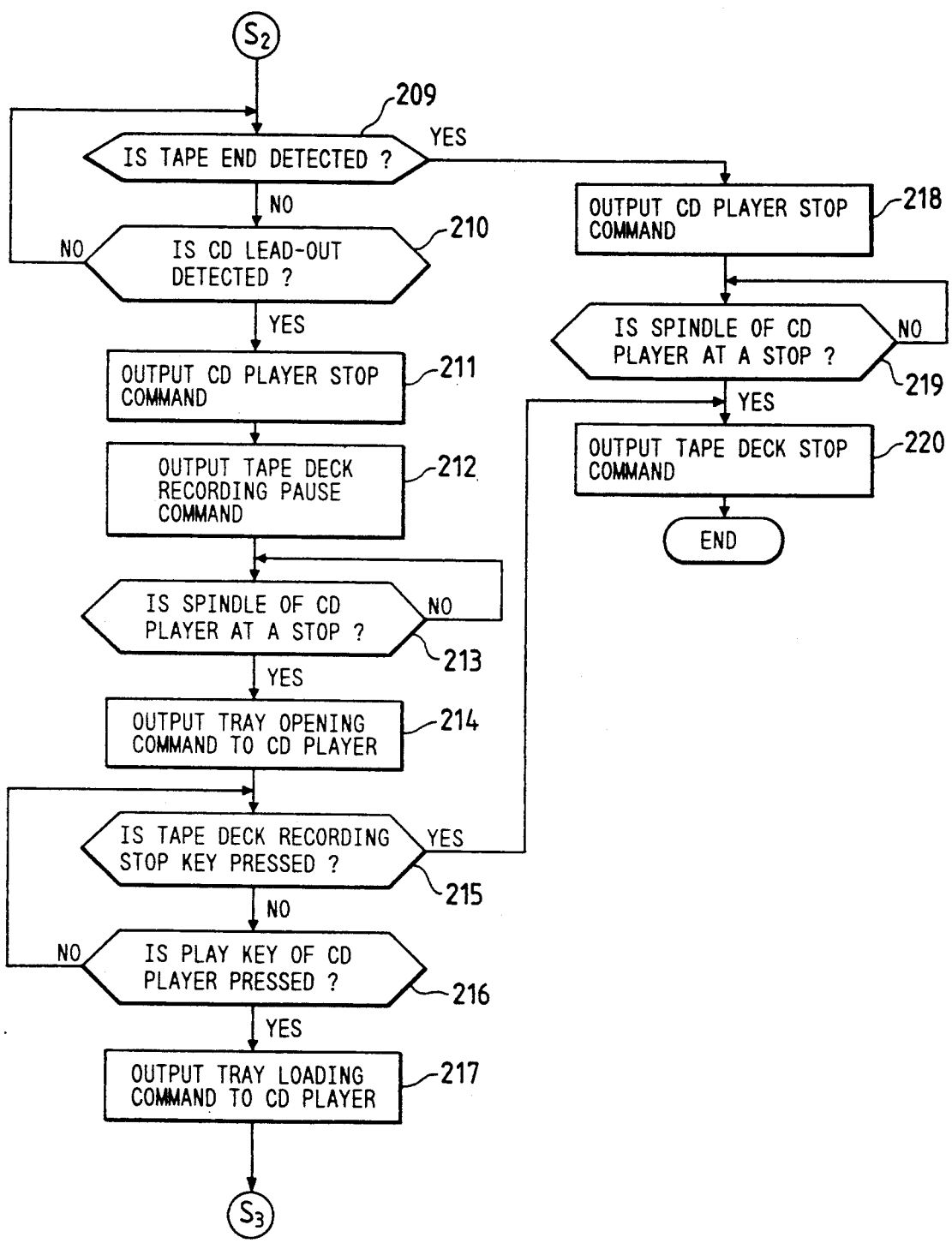
FIG. 4 is a flowchart of the operation of the system controller.

In FIG. 4, the completion of the cassette tape 8 is detected in step 209. The end of the tape 8 is detected by determining the magnitude of the torque exerted on the cassette tape 8 or by detecting changes in reflectance at which a leader tape (a transparent area) in the cassette tape 8 is capable of reflecting radiation. A problem in the present invention is the case in which there remains a non-recorded area in the cassette tape 8 although reproduction of the CD 1 has been completed. Hence, the processing executed in the case where the results of the determination of step 209 are negative is important. If there exists the non-recorded area in the cassette tape 8, the processing goes to step 210.

In step 210, it is determined whether or not CD lead-out is detected to determine the completion of reproduction of the CD 1. If the answer is NO, reproduction has not yet been completed, so the processing returns to 209. If the answer is YES, i.e., if reproduction of the CD 1 has been completed, a stop command signal (c1) is given to the CD player 100A in step 211, and a recording pause command (c2) is then given to the cassette deck 101A in step 212.

Thereafter, stoppage of the spindle motor 2 is confirmed in the CD player 100A in step 213, and a CD tray opening command (d) is then given to the CD tray driving unit 16 in step 214. That is, the motor 53 of the CD tray driving unit 16 is driven to discharge the tray T from the CD player 100A. In other words, the CD tray is automatically opened so as to allow the CD 1 whose reproduction has been completed to be removed. Conventionally, the open key must be pressed each time the CD tray is to be opened.

Next, it is determined in step 215 whether or not the recording stopping key of the cassette deck 101A is pressed. This determination is made to determine whether or not the user desires to complete recording on the cassette tape 8 even though there exists the non-recorded area on the cassette tape 8. If the answer is YES, the processing goes to step 220 where the cassette deck 101A is stopped. If the answer is NO, the processing goes to step 216.

Next, it is determined in step 216 whether or not the play key of the CD player 100A is pressed. Determination made in step 216 may be replaced by the determination made as to whether or not the loading key of the CD 1 is pressed because, in a normal CD player, reproduction is started when either the play key or the loading key is pressed. That is, the CPU has a means for detecting the restart of reproduction of the CD player 100A.

If the play key is pressed, i.e., if the answer is YES, a tray loading command is given to the CD tray driving unit 16 of the CD player 100A to close the CD tray and ready it for reproduction. Thereafter, the processing goes to that of step 203 indicated by (S₃) and synchro-recording is then executed.

If the answer is YES in step 209, i.e., if there exists no non-recorded area in the cassette tape 8, there is no need for reproduction by means of the CD player 100A. So, a stop command (c1) is given to the CD player 100A in step 218, and stop of the spindle motor 2 of the CD player 100A is then confirmed in step 219. Thereafter, a stop command (c2) is given to the cassette deck 101A, and synchro-recording is thereby completed.

Thus, in a dubbing operation which is started by the pressing of the synchro-recording start key (step 200), in a case where there exists the non-recorded area on the cassette tape 8 when reproduction of the CD 1 has been completed (step 210), the CD tray is automatically opened (step 214). Thereafter, when the CD 1 is replaced with another one and the play key is then pressed, synchro-recording is restarted (steps 203 to 208).

The above described first embodiment has advantages in that the CD tray can be automatically opened, and in that, since the system controller 10 is used by both the CD player 100A and the cassette deck 101A, the dubbing apparatus can be operated through the single input key board 15, i.e., the apparatus exhibits excellent operability.

Figure 5:
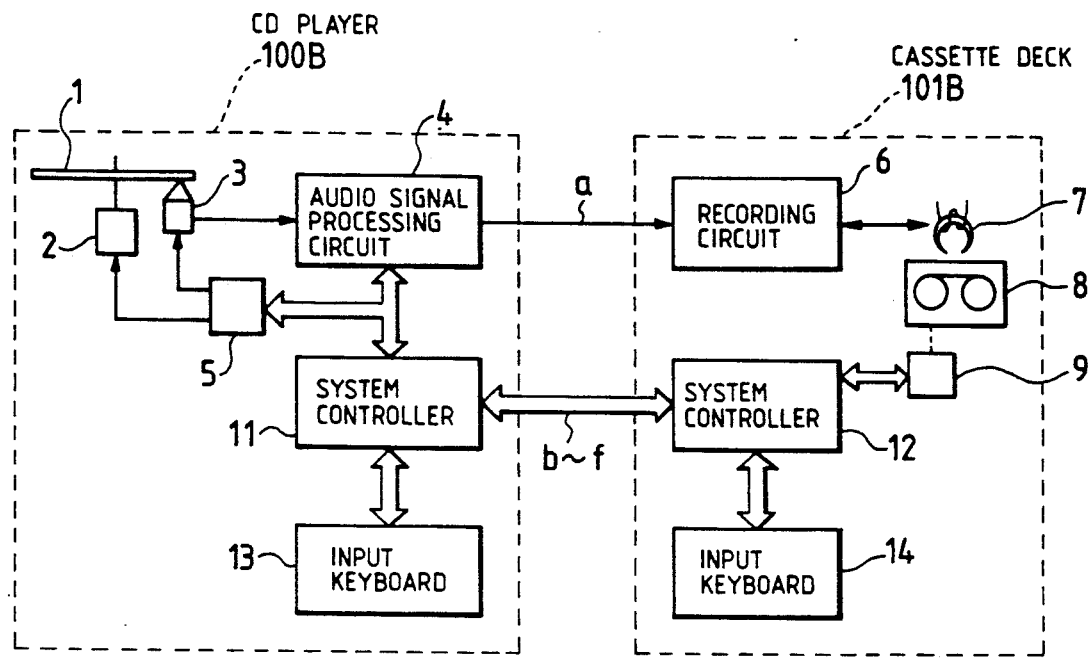
FIG. 5 is a block diagram of a second embodiment of the present invention.

A second embodiment of the present invention will now be described with reference to FIG. 5.

The aforementioned first embodiment is constructed by the CD player 100A, the cassette deck 101A and the controller unit 104, and is arranged such that the controller unit 104 is used by both the CD player 100A and the cassette deck 101A. However, the second embodiment is constructed by a CD player 100B which is the information reproducing device and a cassette deck 101B which is the information recording device and is arranged such that control signals are exchanged between a system controller 11 incorporated in the CD player 100B and a system controller 12 incorporated in the cassette deck 101B to perform synchro-recording. In FIG. 5, the same reference numerals are used to denote parts which are the same as those shown in FIG. 2, description thereof being omitted. Reference numerals 13 and 14 respectively denote input key boards.

The second embodiment has an advantage in that synchro-recording can be performed between the two independent apparatuses by creating the control programs for the system controllers 11 and 12 in conformity with those shown by the flowcharts in FIGS. 3 and 4, i.e., in that degrees of freedom of combination of the information reproducing device 100 and the information recording device 101 can be assured.

Figure 6:
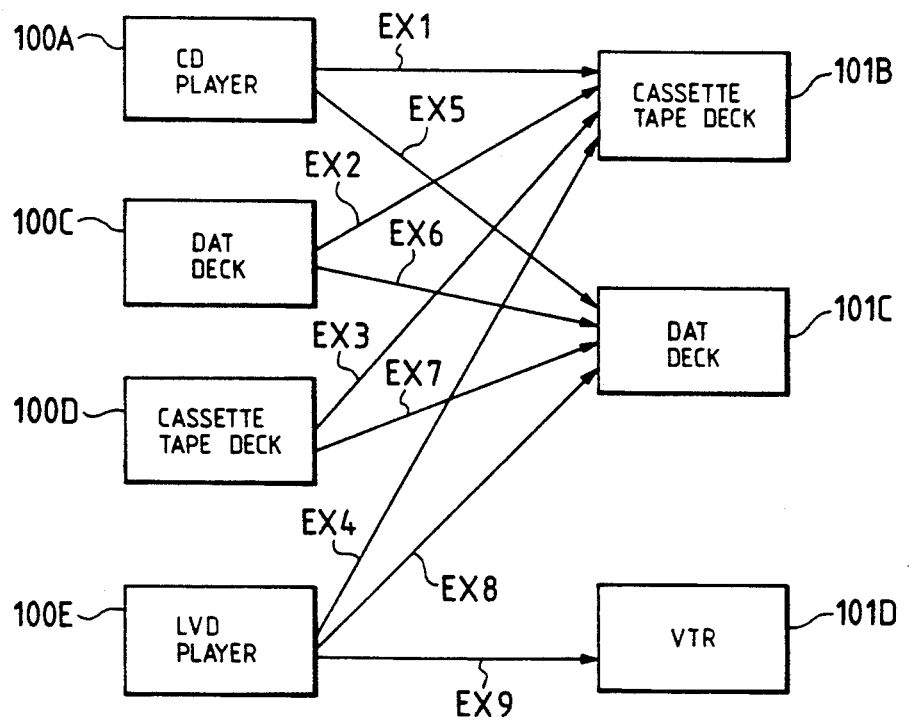
FIG. 6 is a block diagram of modification of the present invention.

Although the above described first and second embodiments employ as the information reproducing device 100 the CD player 100A and 100B and as the information recording device the cassette deck 101A and 101B, application of the present invention is not limited to such combinations. FIG. 6 shows other examples of combination, EX 1 to EX 9, to which the present invention is applicable.

EX 2 employs as the information reproducing device 100 a DAT deck 100C and as the information recording device 101 the cassette deck 101B.

EX 3 employs as the information reproducing device 100 a cassette tape deck 100D and as the information recording device 101 the cassette deck 100B.

EX 4 employs as the information reproducing device 100 a LVD (laser vision disk) player 100E and as the information recording device 101 the cassette deck 101B. This example is employed when it is desired to make a copy of only music information recorded on an LVD.

Similarly, EX 5, EX 6, EX 7, EX 8 and EX 9 respectively employ a combination of the CD player 100A and the DAT deck 101C, a combination of the DAT deck 100C and the DAT deck 101C, a combination of the take deck 100D and the DAT deck 101C, a combination of the LVD player 100E and the DAT deck 101C and a combination of the LVD player 100E and a VTR 101D. In the above described embodiments from EX 1 to EX 9, the reproduction signal (a) may be an analog or digital signal. If the types of signals processed in the information reproducing and recording devices do not coincide, an analog and digital converter or a digital and analog converter may be provided. Alternatively, information reproducing and recording devices which employ the same type of signal may be combined to form a dubbing apparatus. In the combinations from EX 1 to EX 9, operability can be improved by arranging the apparatus such that the recording medium in the information reproducing device 100 is automatically removable.

As will be understood from the foregoing description, according to the present invention, since the first recording medium can be automatically removed from the information reproducing device when reproduction of the first recording medium has been completed, it is not necessary that the operation of removing the first recording medium be conducted each time the reproduction of the first recording medium is completed, and a troublesome operation is eliminated.

What is claimed is:

1. An information recording/reproducing apparatus comprising:
   an information reproducing device in which a first recording medium is detachably housed, said information reproducing device reproducing and outputting information recorded on said first recording medium;
   an information recording device for recording, during a recording operation, said information output by said information reproducing device onto a second recording medium;
   reproduction completion detection means for detecting completion of reproduction of said information recorded on said first recording medium;

reproduction restart detection means for detecting restart of reproduction of information output by said information reproducing device; and control means for automatically outputting a stop command to stop said recording operation of said information recording device in a state where a recordable area of said second recording medium is left blank and for automatically outputting a removal command to eject automatically said first recording medium from said information reproducing device when said completion of reproduction is detected, said control means automatically outputting a start command to restart said recording operation of said information recording device when said restart of said reproduction is detected, after said automatic ejection.

2. An information recording and reproduction apparatus according to claim 1, wherein said control means outputs the stop command when the reproduction of said first recording medium is completed in a state where a recordable area of said second recording medium is present.

3. An information recording and reproducing apparatus according to claim 1, wherein said control means comprises a single controller unit.

4. An information recording and reproducing apparatus according to claim 1, wherein said control means comprises a first control unit for controlling said information reproducing device and a second control unit for controlling said information recording device.

5. An information recording and reproducing apparatus according to claim 1, wherein said reproduction restart detection means detects the restart of the reproduction by means of a CD player by detecting pressing of either a play key or a loading key.

6. An information recording and reproducing apparatus according to claim 1, wherein said recording medium is a CD, and wherein said reproduction completion detection means detects the completion of the reproduction by detecting a lead-out portion of said CD.

7. An information recording and reproducing apparatus according to claim 1, wherein said control means restarts said recording operation after a new recording medium has been substituted for said first recording medium in said information reproducing device.

8. An information recording and reproducing apparatus according to claim 1, wherein said control means determines whether a recording stop key has been pressed, after the first recording means is automatically removed and before said restart of reproduction is detected.

9. An information recording and reproducing apparatus according to claim 8, wherein said control means does not restart said reproduction if said recording stop key has been pressed.

10. An information recording and reproducing apparatus according to claim 1, further comprising:

means for detecting the end of said first recording medium, and means for detecting the end of said second recording medium, said control means outputting a stop command to stop the information reproducing device when the completion of reproduction of said first recording medium is detected, and outputting a stop command to stop the information reproducing device when the end of said second recording medium is detected.

* * * * *